(12) United States Patent
Katsumata et al.

(10) Patent No.: US 11,067,971 B2
(45) Date of Patent: Jul. 20, 2021

(54) PRODUCTION LINE CONFIGURATION CHANGE SYSTEM AND PRODUCTION LINE CONFIGURATION CHANGE METHOD

(71) Applicant: Hitachi, Ltd., Tokyo (JP)

(72) Inventors: Daisuke Katsumata, Tokyo (JP); Takafumi Chida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 289 days.

(21) Appl. No.: 16/321,476

(22) PCT Filed: Mar. 5, 2018

(86) PCT No.: PCT/JP2018/008216
§ 371 (c)(1),
(2) Date: Jan. 29, 2019

(87) PCT Pub. No.: WO2019/003497
PCT Pub. Date: Jan. 3, 2019

(65) Prior Publication Data
US 2020/0159194 A1    May 21, 2020

(30) Foreign Application Priority Data

Jun. 28, 2017  (JP) .............................. JP2017-126368

(51) Int. Cl.
*G05B 19/418*    (2006.01)
(52) U.S. Cl.
CPC .................. *G05B 19/4189* (2013.01); *G05B 2219/31274* (2013.01)
(58) Field of Classification Search
CPC ...... G05B 19/4189; G05B 2219/31274; G05B 2219/32253; G05B 19/41865; Y02P 90/30; Y02P 90/02; G06Q 50/04
See application file for complete search history.

(56) References Cited

U.S. PATENT DOCUMENTS 5,186,303 A * 2/1993 Seto .................... G05B 19/4182
198/345.1
6,658,312 B1 * 12/2003 Hagiyama .............. H01R 43/28
29/33 F
(Continued)

FOREIGN PATENT DOCUMENTS

CN      105094092 A    11/2015
JP      63-099161 A     4/1988
(Continued)

OTHER PUBLICATIONS

International Search Report of PCT/JP2018/008216 dated Apr. 24, 2018.
(Continued)

*Primary Examiner* — Charles R Kasenge
(74) *Attorney, Agent, or Firm* — Mattingly & Malur, PC

(57) ABSTRACT

The production line configuration change system includes: an error information storage unit that stores information of an error which occurs in equipment on a production line; a work information storage unit that stores work contents required for manufacturing a product; an equipment information storage unit that stores constraint information of a tool mountable on the equipment; a production line configuration information storage unit that, in order of manufacturing processes of the product, stores a work content, work assignment equipment, a tool mounted on the equipment, and a process tact time in each of the manufacturing processes; and a production line configuration calculation unit that is activated immediately after the error occurs, prepares a change plan of assigning a work assigned to the equipment in which the error occurs to the equipment before or after the process or another equipment of the identical process and calculates a provisional production line configuration.

8 Claims, 14 Drawing Sheets

(56) References Cited

U.S. PATENT DOCUMENTS

| 2003/0195794 | A1* | 10/2003 | Yasuda | G05B 19/418 |
| | | | | 705/7.25 |
| 2009/0019322 | A1* | 1/2009 | Sekiyama | G07C 3/005 |
| | | | | 714/55 |
| 2013/0304245 | A1* | 11/2013 | Lam | G05B 19/41875 |
| | | | | 700/109 |
| 2018/0046953 | A1* | 2/2018 | Murakami | G06Q 10/0631 |

FOREIGN PATENT DOCUMENTS

| JP | 04-250957 A | 9/1992 |
| JP | 2003-316415 A | 11/2003 |
| JP | 2006-031360 A | 2/2006 |

OTHER PUBLICATIONS

Chinese Office Action received in corresponding Chinese Application No. 201880001937.7 dated Dec. 16, 2020.

* cited by examiner

[Fig. 1]
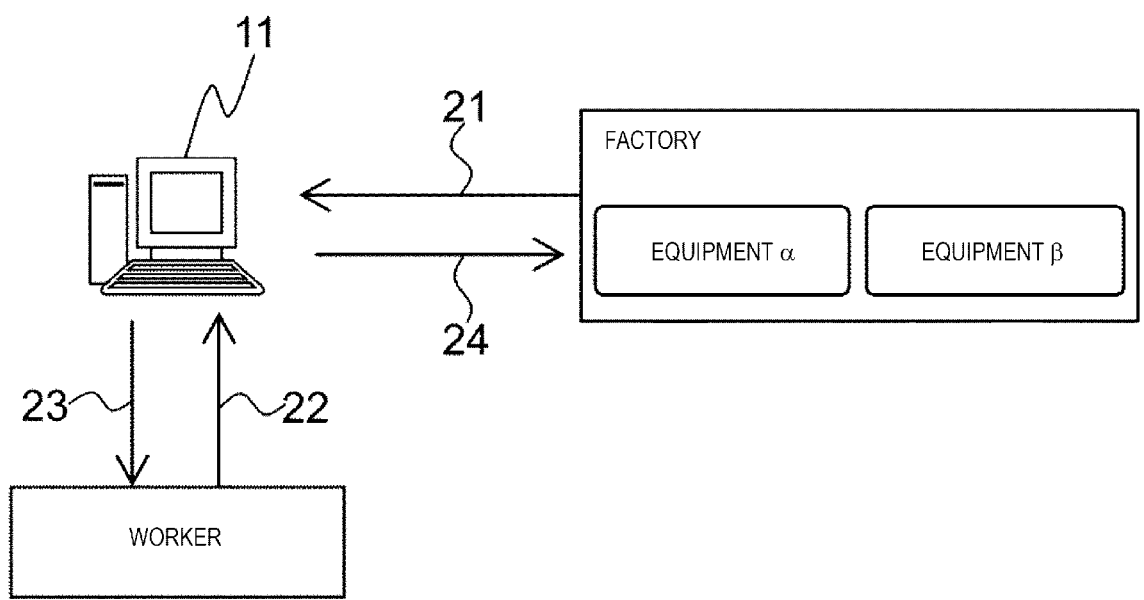

[Fig. 2]
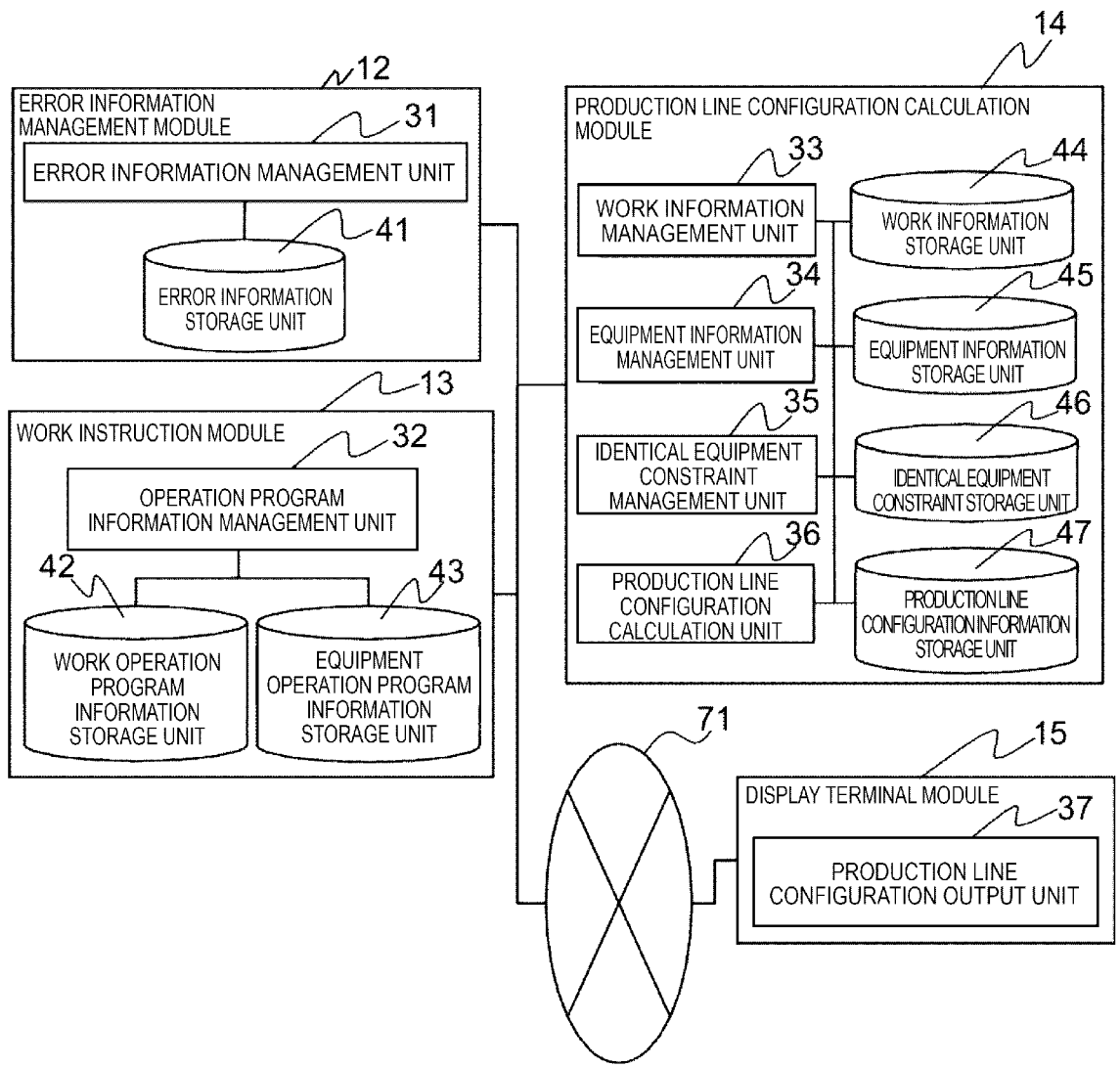

[Fig. 3]
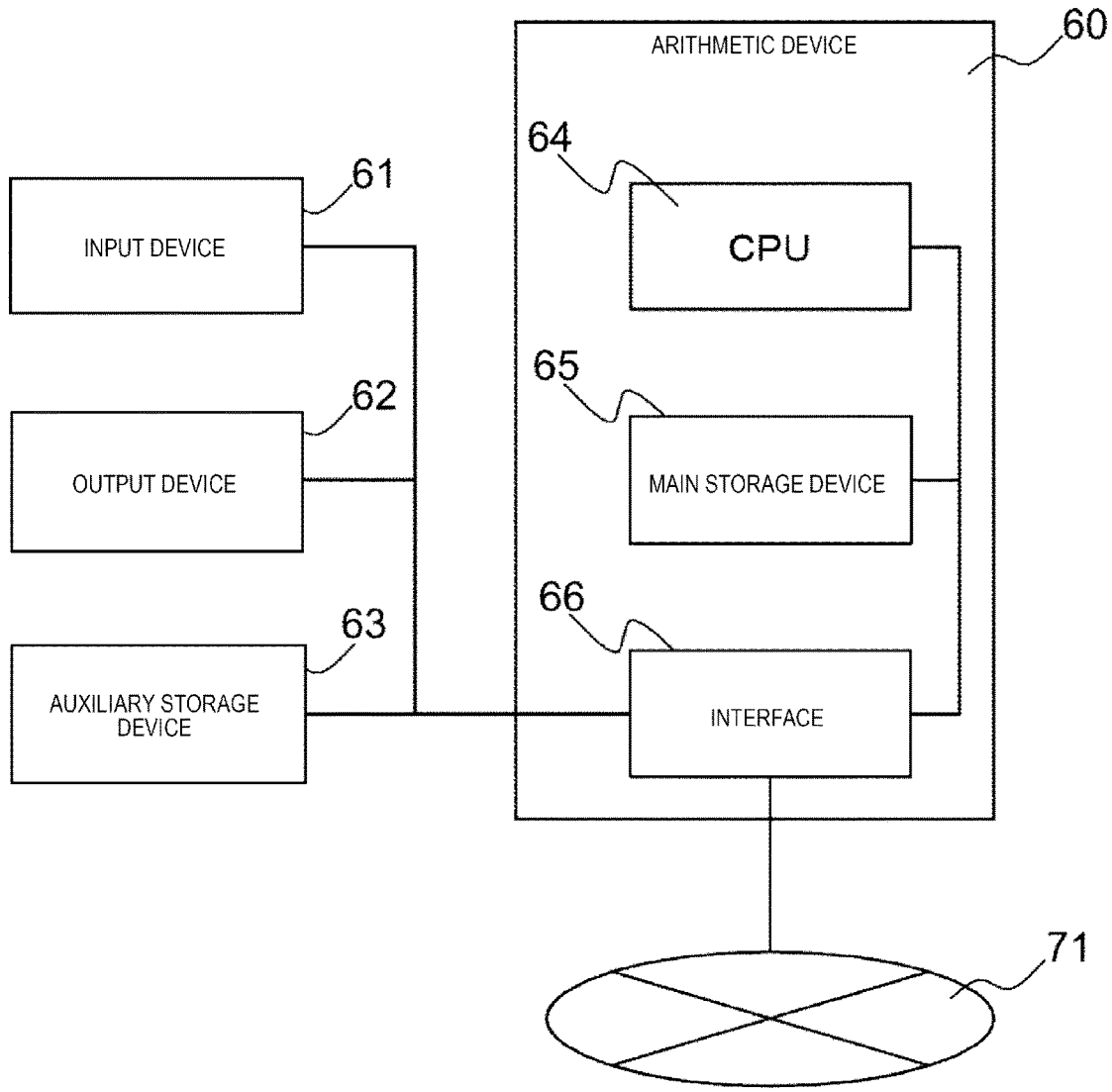
[Fig. 4]
| EQUIPMENT ID | EQUIPMENT NAME | OCCURRENCE TIME | ESTIMATED RECOVERY TIME | RECOVERY COMPLETION TIME |
|---|---|---|---|---|
| 001 | R004 | 2017/2/15 3:00 | 2017/2/15 15:00 | - |
| ⋮ | ⋮ | ⋮ | ⋮ | ⋮ |
| ⋮ | ⋮ | ⋮ | ⋮ | ⋮ |
341a, 341b, 341c, 341d, 341e — 41

[Fig. 5]
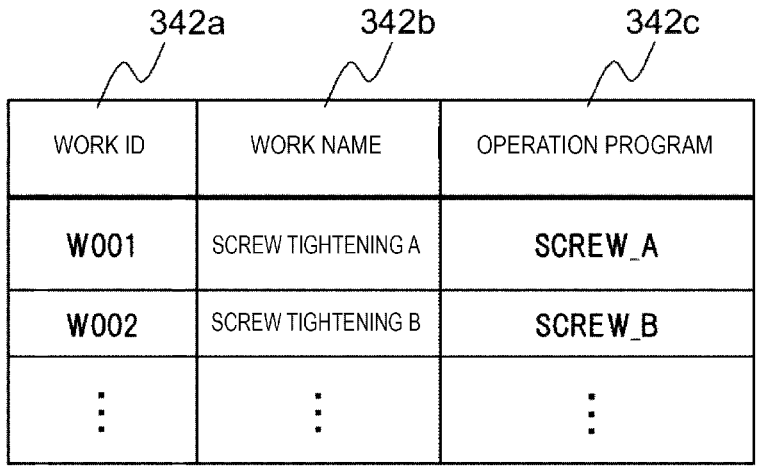
[Fig. 6]
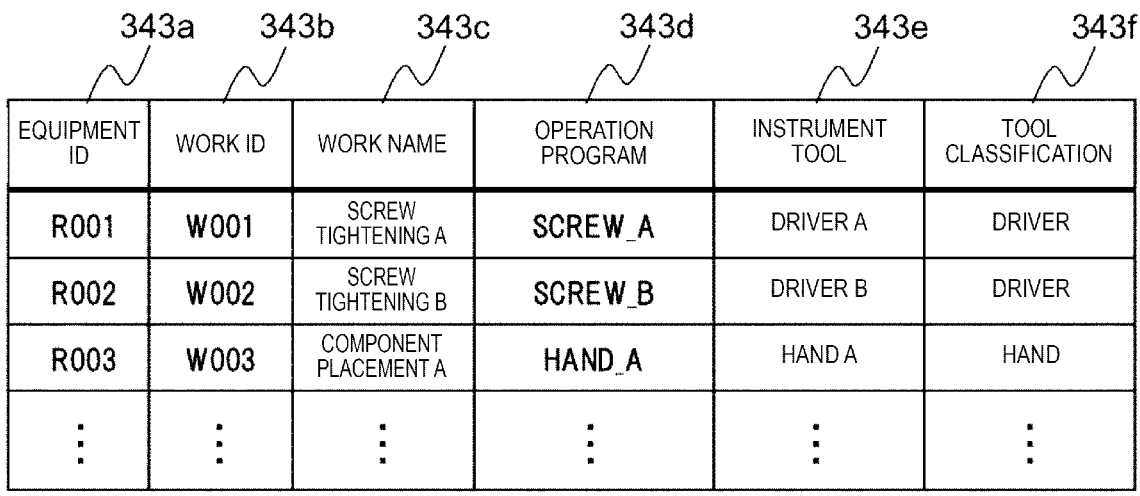

[Fig. 7]
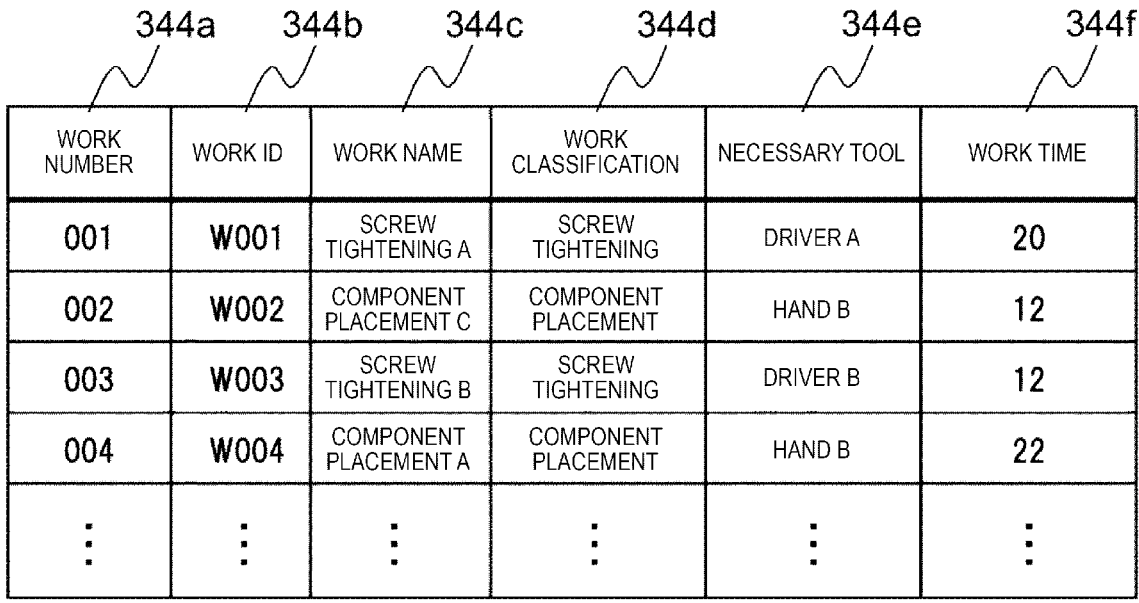
[Fig. 8]
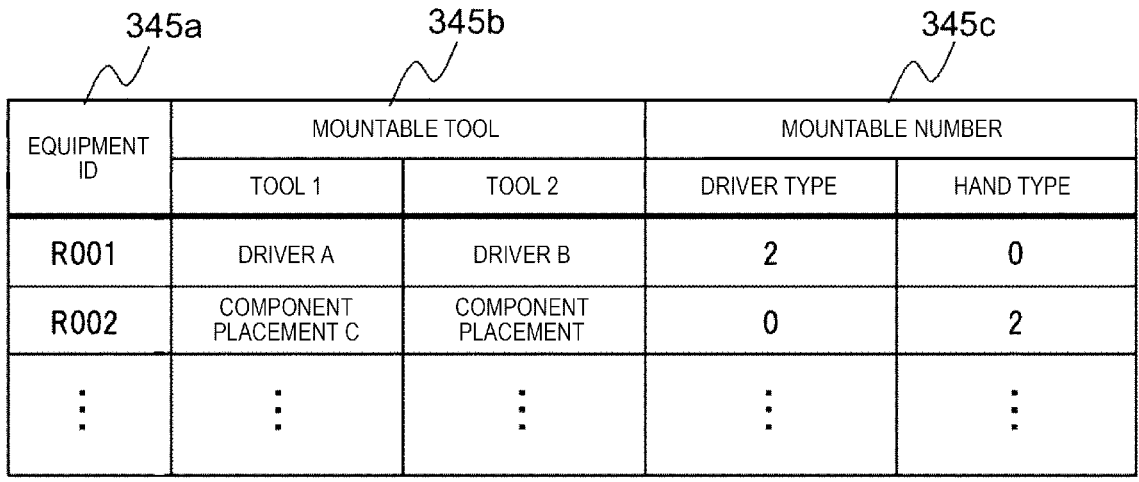

| CONSTRAINT No (346a) | WORK NUMBER_1 (346b) | WORK NUMBER_2 (346c) |
|---|---|---|
| 001 | 001 | 002 |
| 002 | 006 | 007 |
| 003 | 007 | 008 |
| ⋮ | ⋮ | ⋮ |

| PROCESS NUMBER (347a) | WORK NUMBER (347b) | WORK NAME (347c) | WORK CLASSIFICATION (347d) | EQUIPMENT ID (347e) | | TOOL NAME (347f) | | PROCESS TACT TIME (347g) |
|---|---|---|---|---|---|---|---|---|
| | | | | 1 | 2 | 1 | 2 | |
| 1 | 001 | SCREW TIGHTENING A | SCREW TIGHTENING | R001 | R002 | DRIVER A | DRIVER A | 16 |
| | 002 | COMPONENT PLACEMENT C | COMPONENT PLACEMENT | R001 | R002 | HAND B | HAND B | |
| 2 | 003 | SCREW TIGHTENING B | SCREW TIGHTENING | R003 | | DRIVER A | | 12 |
| 3 | 004 | COMPONENT PLACEMENT A | COMPONENT PLACEMENT | R004 | R005 | HAND B | HAND B | 11 |
| 4 | 005 | COMPONENT PLACEMENT A | COMPONENT PLACEMENT | H01 | | | | 11 |
| ⋮ | ⋮ | ⋮ | ⋮ | ⋮ | ⋮ | ⋮ | ⋮ | ⋮ |

[Fig. 11]
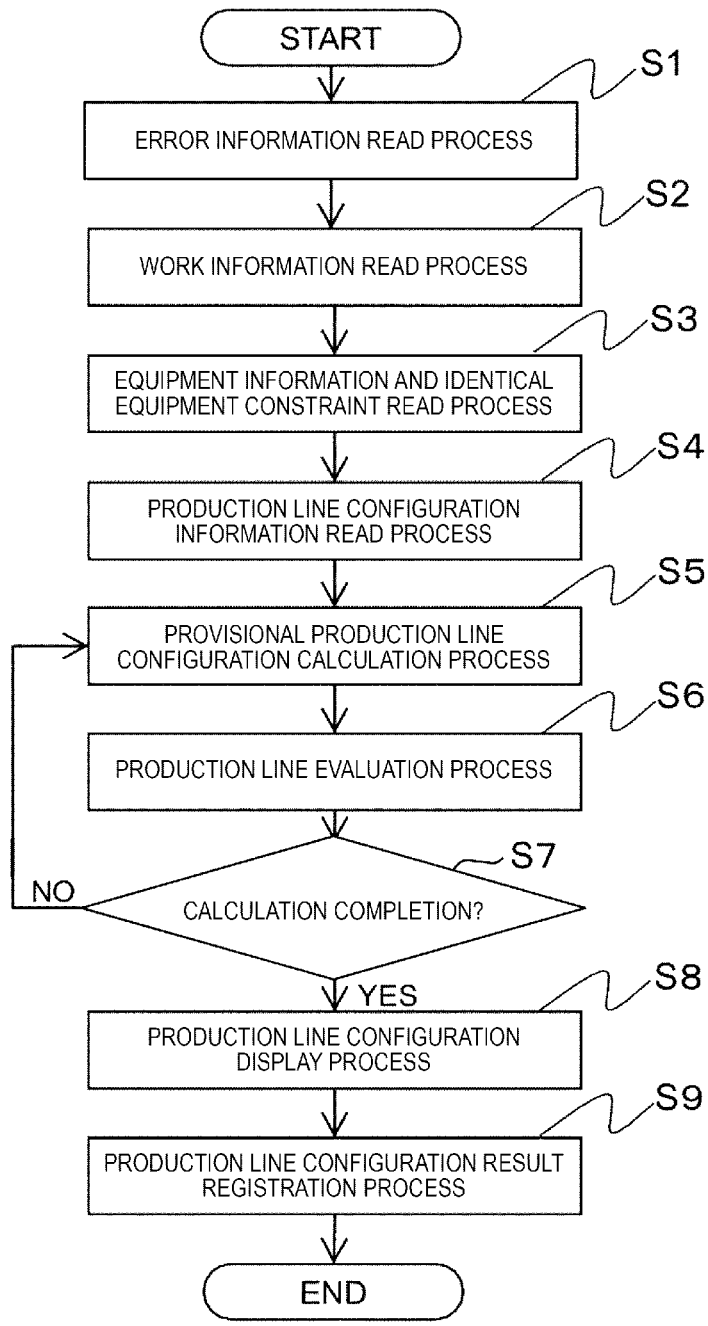

[Fig. 12]
| PROCESS | PROCESS 1 | PROCESS 2 | PROCESS 3 | PROCESS 4 |
|---|---|---|---|---|
| LINE CONFIGURATION | R1, R2 | R3, R4 (ERROR) | R5 | R6, R7 |
| WORK ASSIGNMENT | COMPONENT PLACEMENT 1 SCREW TIGHTENING 1 | COMPONENT PLACEMENT 2 SCREW TIGHTENING 2 | COMPONENT PLACEMENT 3 | SCREW TIGHTENING 3 SCREW TIGHTENING 4 |
| INSTRUMENT | DRIVER A | DRIVER B | - | DRIVER B |
| TACT [min] | 3 | 2 | 1.5 | 3.2 |
[Fig. 13]
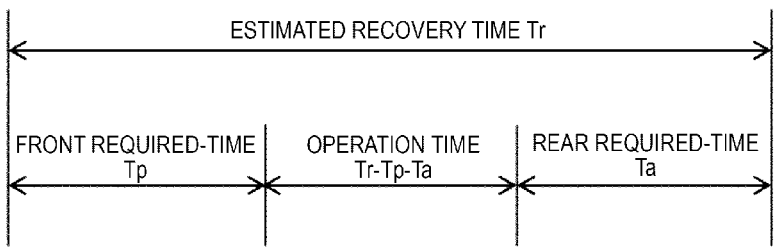

[Fig. 14]
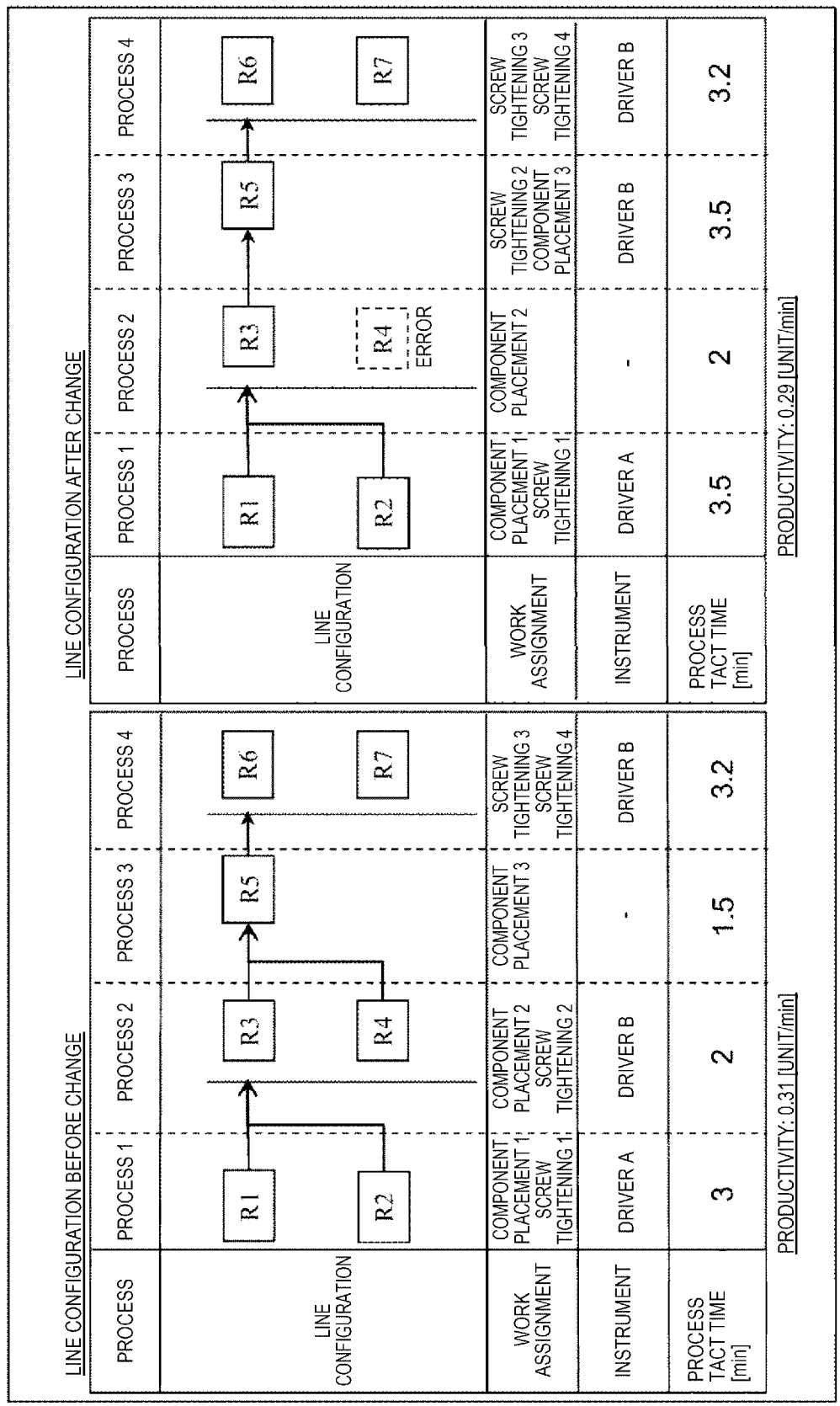

[Fig. 15]
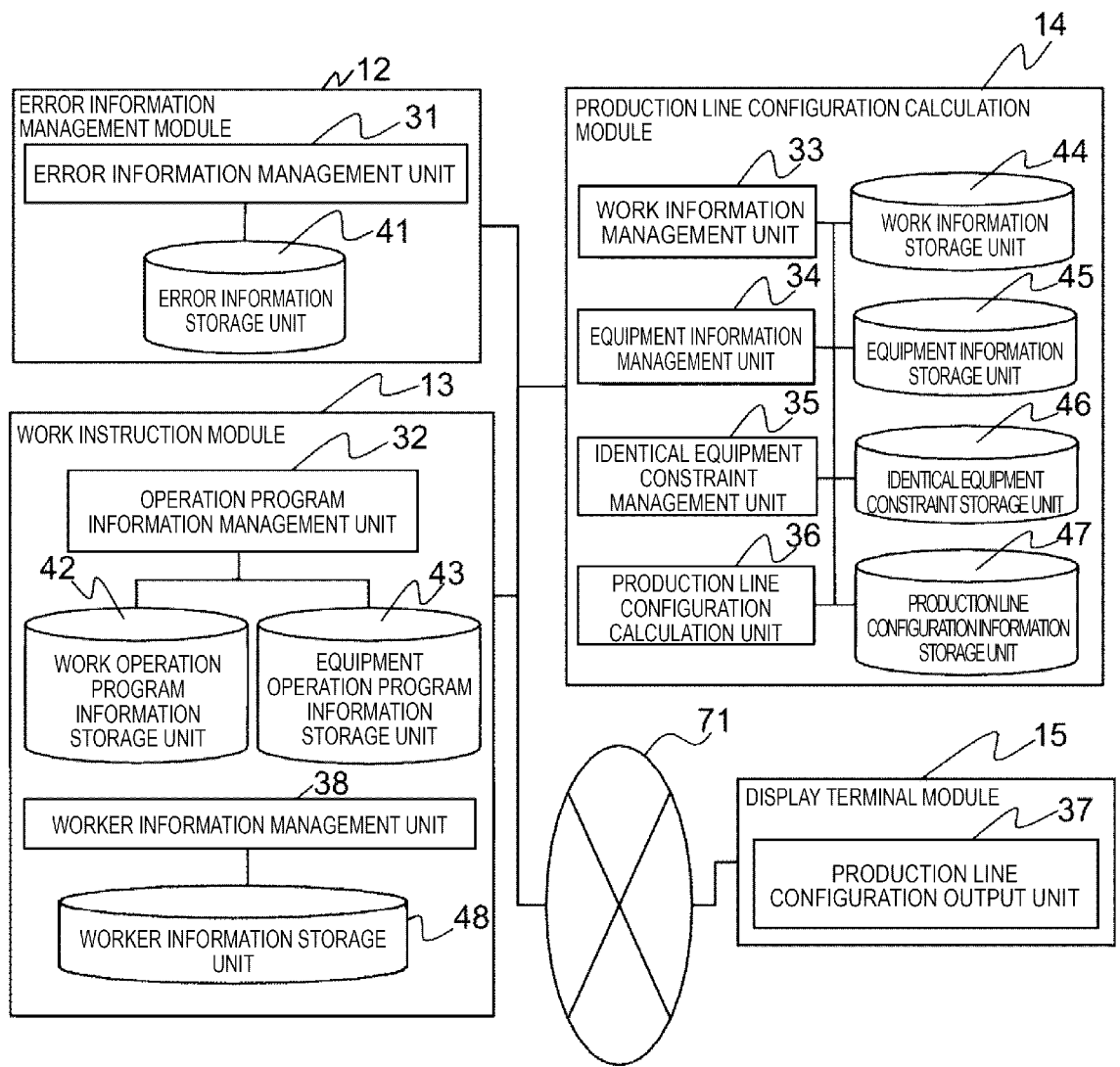

Figures 16, 17:
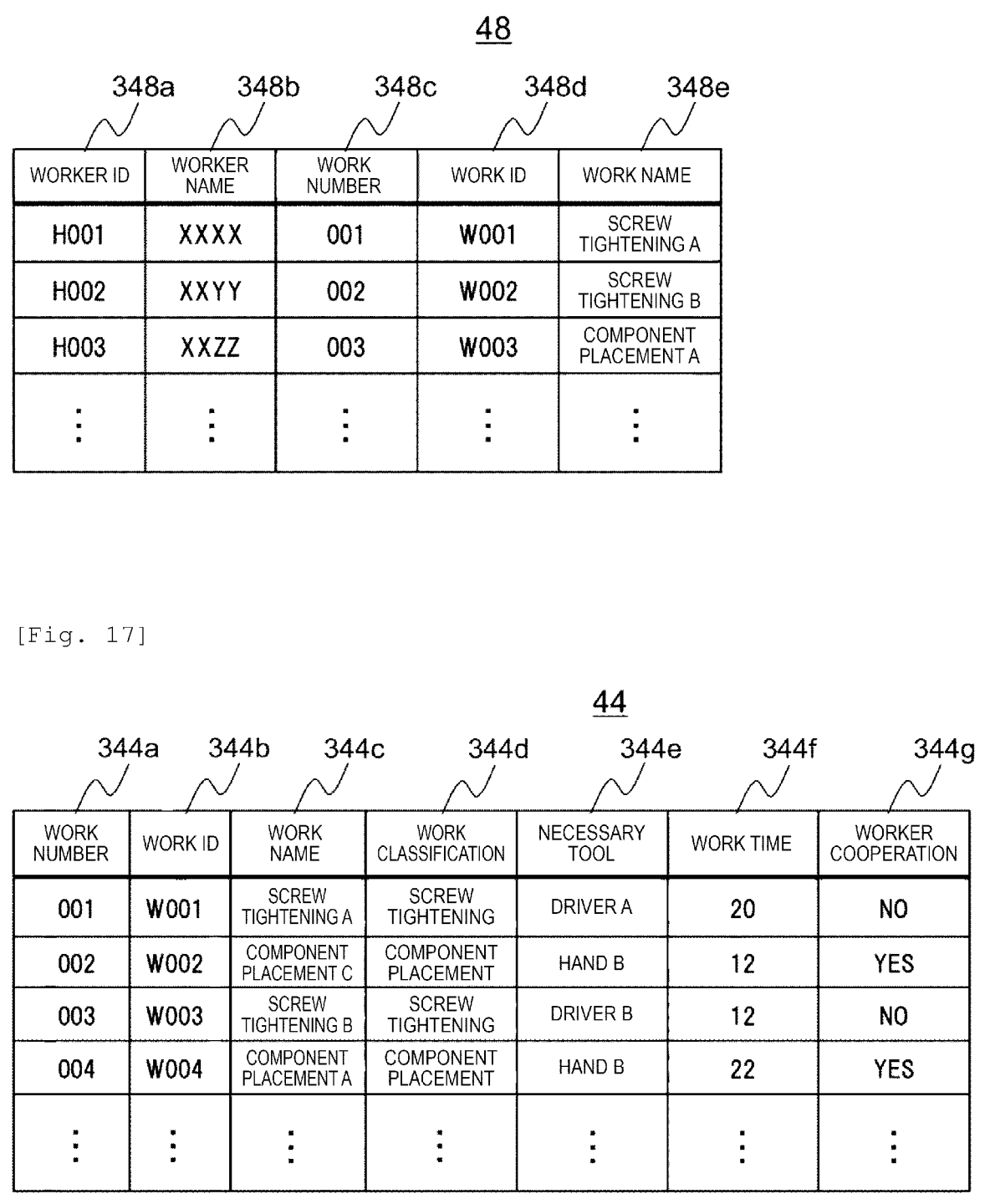

| WORKER ID (348a) | WORKER NAME (348b) | WORK NUMBER (348c) | WORK ID (348d) | WORK NAME (348e) |
|---|---|---|---|---|
| H001 | XXXX | 001 | W001 | SCREW TIGHTENING A |
| H002 | XXYY | 002 | W002 | SCREW TIGHTENING B |
| H003 | XXZZ | 003 | W003 | COMPONENT PLACEMENT A |
| ⋮ | ⋮ | ⋮ | ⋮ | ⋮ |

| WORK NUMBER (344a) | WORK ID (344b) | WORK NAME (344c) | WORK CLASSIFICATION (344d) | NECESSARY TOOL (344e) | WORK TIME (344f) | WORKER COOPERATION (344g) |
|---|---|---|---|---|---|---|
| 001 | W001 | SCREW TIGHTENING A | SCREW TIGHTENING | DRIVER A | 20 | NO |
| 002 | W002 | COMPONENT PLACEMENT C | COMPONENT PLACEMENT | HAND B | 12 | YES |
| 003 | W003 | SCREW TIGHTENING B | SCREW TIGHTENING | DRIVER B | 12 | NO |
| 004 | W004 | COMPONENT PLACEMENT A | COMPONENT PLACEMENT | HAND B | 22 | YES |
| ⋮ | ⋮ | ⋮ | ⋮ | ⋮ | ⋮ | ⋮ |

[Fig. 18]
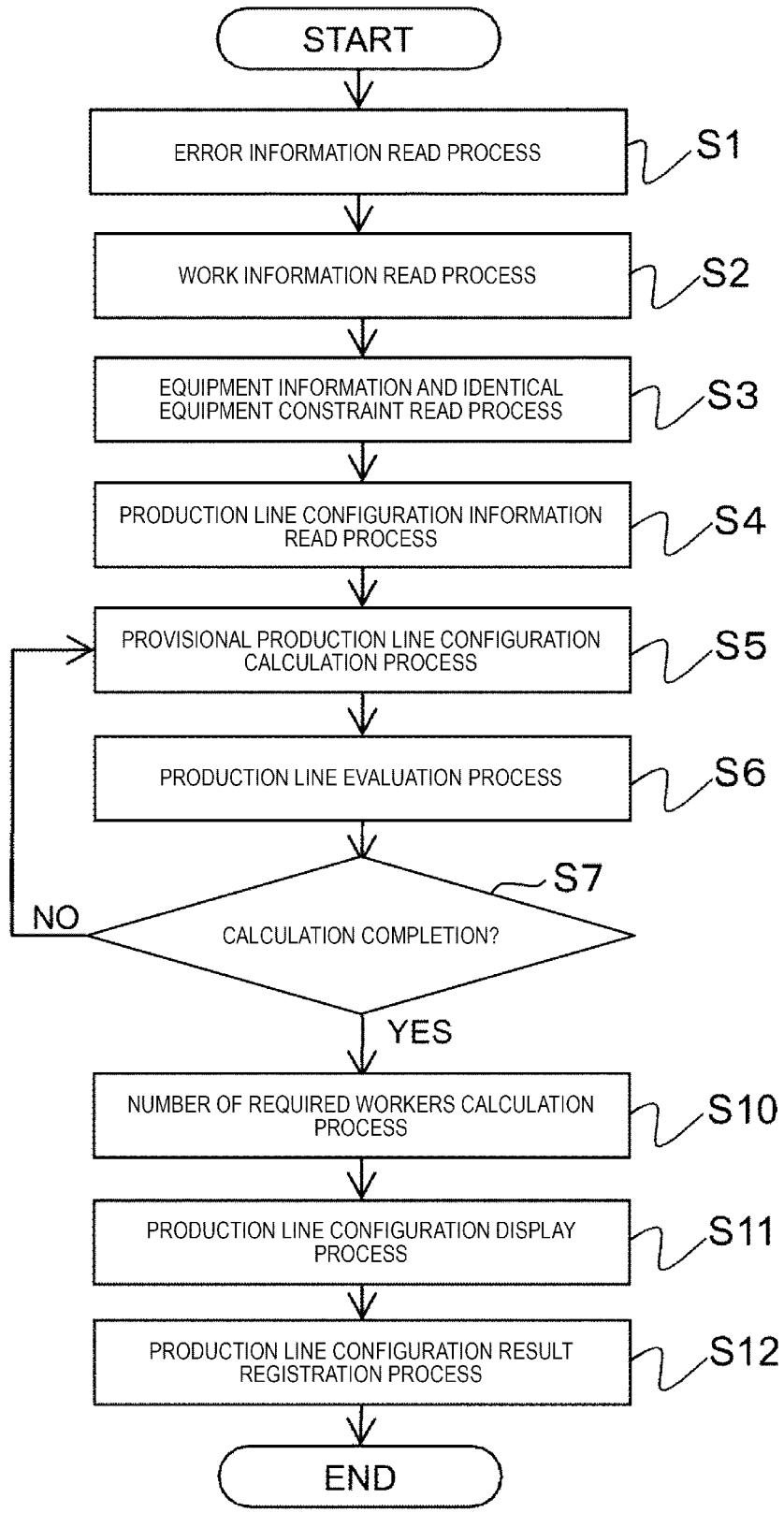

[Fig. 19]
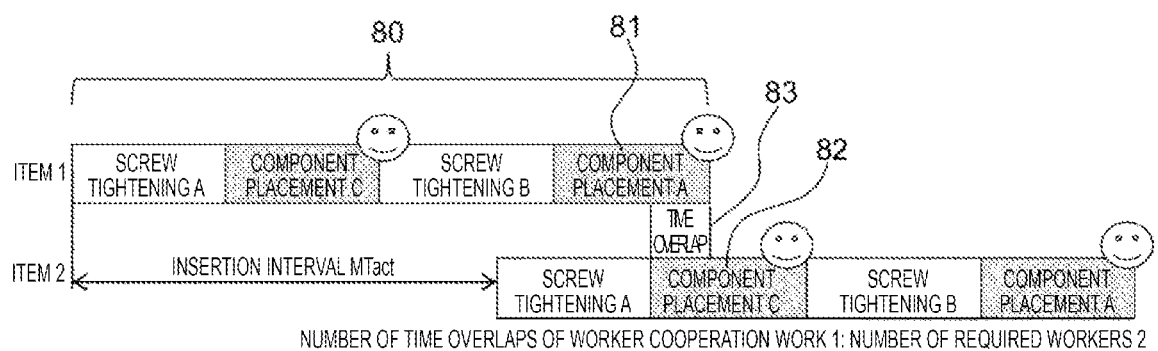
[Fig. 20]
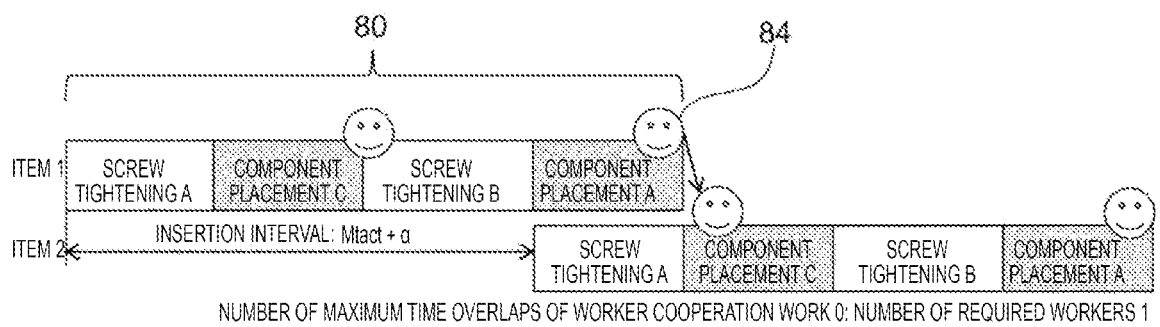

[Fig. 21]

| | TWO WORKERS | THREE WORKERS | FOUR WORKERS |

LINE CONFIGURATION BEFORE CHANGE

| PROCESS | PROCESS 1 | PROCESS 2 | PROCESS 3 | PROCESS 4 |
|---|---|---|---|---|
| LINE CONFIGURATION | R2 / R2 | R3 / R4 | R5 | R6 / R7 |
| WORK ASSIGNMENT | COMPONENT PLACEMENT 1; SCREW TIGHTENING 1 | COMPONENT PLACEMENT 2; SCREW TIGHTENING 2 | COMPONENT PLACEMENT 3 | SCREW TIGHTENING 3; SCREW TIGHTENING 4 |
| INSTRUMENT | DRIVER A | DRIVER B | - | DRIVER B |
| TACT [min] | 3 | 2 | 1.5 | 3.2 |

INSERTION INTERVAL: 3.2 [min]
PRODUCTIVITY: 0.31 [UNIT/min]

LINE CONFIGURATION AFTER CHANGE

| PROCESS | PROCESS 1 | PROCESS 2 | PROCESS 3 | PROCESS 4 |
|---|---|---|---|---|
| LINE CONFIGURATION | R1 / R2 | R3 / R4 ERROR | R5 (85) / (86) | R6 / R7 |
| WORK ASSIGNMENT | COMPONENT PLACEMENT 1; SCREW TIGHTENING 1 | COMPONENT PLACEMENT 2 | SCREW TIGHTENING 2; COMPONENT PLACEMENT 3 | SCREW TIGHTENING 3; SCREW TIGHTENING 4 |
| INSTRUMENT | DRIVER A | - | DRIVER B | DRIVER B |
| TACT [min] | 3.5 | 2 | 3.5 | 3.2 |

INSERTION INTERVAL: 3.4 [min]
PRODUCTIVITY: 0.29 [UNIT/min]

PRODUCTION LINE CONFIGURATION CHANGE SYSTEM AND PRODUCTION LINE CONFIGURATION CHANGE METHOD

TECHNICAL FIELD

The present invention is related to a production line configuration change system and a production line configuration change method for reconfiguring a production line in a case where an error or the like occurs on the production line or a case where a design change in a product occurs.

BACKGROUND ART

There is a technology in which in a human-robot cooperation production line, for example, in a case where a trouble or an error occurs in a certain robot and an operation stops, until the robot is recovered, by using a tool currently included in the production line, a production line configuration is promptly changed so as to continue optimum production. Since the robot here is replaced with general manufacturing equipment, the robot is referred to as manufacturing equipment after this.

As a background art in the related art, there is a PTL 1. As a system 10 which supports a change in a production plan in a case where a part of manufacturing equipment is paused due to occurrence of a trouble or abnormality when a production line is automatically operated based on schedule data of the production plan prepared according to a production demand of various types of products, PTL 1 discloses a production plan change supporting system which includes manufacturing lot classification means 6 for classifying manufacturing lots which can be manufactured based on a given evaluation condition, manufacturing lot display means 7 for displaying classified manufacturing lots by classification by proposing the basis of the evaluation, manufacturing lot selecting/editing means 8 for selecting the production lot to be incorporated into a re-plan among the manufacturing lots classified for each of the evaluation conditions and editing the manufacturing lot in a case where it is necessary to change configuration elements in a given manufacturing lot in advance, and schedule preparation means 9 for preparing the re-plan.

In addition, PTL 2 disclosures a production line plan supporting apparatus which includes a production simulation unit 11 for simulating a production line operation from production line plan information and a countermeasure means analyzing unit 12 for selecting at least one piece of equipment having a production capacity and/or an investment cost required for making a simulation result close to a target production capacity and a target investment cost from a countermeasure information storage unit 15 and outputting the one piece of equipment to a production simulation unit, in which a simulation is executed again by the equipment selected by the countermeasure means analyzing unit 12, so that the equipment which optimizes the production capacity and the investment cost for a production line plan is automatically selected.

CITATION LIST

Patent Literature

PTL 1: JP-A-2003-316415
PTL 2: JP-A-2006-31360

SUMMARY OF INVENTION

Technical Problem

In the technology disclosed in PTL 1, when a part of the manufacturing equipment stops due to an error or a trouble, a schedule content once planned is changed in the middle, the manufacturing lot which can be manufactured is classified based on an evaluation condition and the schedule is automatically prepared again. The technology does not mention that a production line configuration is changed in the manufacturing equipment which can be operated.

In the technology disclosed in PTL 2, when designing a production line, by selecting a countermeasure proposal prepared in advance, changing a plan of the production line, and repeating evaluation by a simulation so as to be close to a target production capacity and a target investment cost, the equipment investment cost on the production capacity is optimized. However, the technology disclosed in PTL 2 does not mention that in a case where an error, a trouble, or a design change occurs in the production line, by using equipment and a tool included in the current production line, a production line configuration is designed again.

The present invention provides a production line configuration change system and a production line configuration change method for, in a case where an error or the like occurs on a production line or a case where a design change in a product occurs, promptly reconfiguring a production line by using equipment and a tool included in the current production line and maximizing a production quantity until the error is recovered or a manufacturing deadline of the product having the design change.

Solution to Problem

According to the present embodiment, there is provided a production line configuration change system including: an error information storage unit that stores information of an error which occurs in equipment on a production line; a work information storage unit that stores work contents required for manufacturing a product; an equipment information storage unit that stores constraint information of a tool mountable on the equipment; a production line configuration information storage unit that, in order of manufacturing processes of the product, stores a work content, work assignment equipment, a tool mounted on the equipment, and a process tact time in each of the manufacturing processes; and a production line configuration calculation unit that is activated immediately after the error occurs, prepares a change plan of assigning a work assigned to the equipment in which the error occurs to the equipment before or after the process or another equipment of the identical process, for production line configuration information stored in the production line configuration information storage unit, by using the equipment and the tool included in the production line, and calculates a provisional production line configuration.

In addition, in the production line configuration change system, the production line configuration calculation unit, among the provisional production line configurations calculated by a plurality of change plans, adopts the provisional production line configuration of anticipating the largest production quantity during an operation time obtained by subtracting a set-up time required for instrument replacement from an estimated recovery time until an estimated recovery timing of the equipment in which the error occurs.

In addition, in the production line configuration change system, the production line configuration calculation unit is activated not by the occurrence of the error of the equipment of the production line but by a request of manufacture of a second product having a design change, by using the equipment and the tool included in the production line, for the production line configuration information stored in the production line configuration information storage unit, prepares a change plan of assigning a work specific to the second product to the equipment of the production line, and calculates the provisional production line configuration.

According to the present embodiment, there is also provided a production line configuration change method of changing a production line configuration by a calculator, the method including: in a case where an error occurs in equipment constituting a production line and the equipment stops, by using equipment and a tool included in the production line, for production line configuration information before the error occurs, preparing a change plan of assigning a work assigned to the equipment in which the error occurs to the equipment before or after a process or another equipment of the identical process and calculating a provisional production line configuration; when calculating the provisional production line configuration, calculating only the provisional production line configuration satisfying the maximum number per classification of the tool mountable on the equipment, a work group which needs to be assigned to the identical equipment, and a constraint that a total number of tools of the production line configuration after the change is to be equal to or smaller than the total number of tools included in the production line immediately after the error occurs; among the provisional production line configurations calculated by a plurality of change plans, performing determination of adopting the provisional production line configuration of anticipating the largest production quantity during an operation time obtained by subtracting a set-up time required for instrument replacement from an estimated recovery time until an estimated recovery timing of the equipment in which the error occurs; and changing an operation program of the work of the equipment on the production line according to the determined provisional production line configuration.

Advantageous Effects of Invention

According to the present invention, when an error or a trouble occurs on a production line, at the time of a design change in a product, by changing a production line configuration satisfying an equipment constraint and a worker constraint of the production line, it is possible to improve a production capacity.

BRIEF DESCRIPTION OF DRAWINGS

FIG. 1 is a diagram illustrating an example of an embodiment of a production line configuration change system.
FIG. 2 is an example of a system configuration diagram of the production line configuration change system.
FIG. 3 is a diagram illustrating a hardware configuration of an information terminal.
FIG. 4 is a diagram illustrating an example of a data table of an error information storage unit.
FIG. 5 is a diagram illustrating an example of a data table of a work operation program information storage unit.
FIG. 6 is a diagram illustrating an example of a data table of an equipment operation program information storage unit.
FIG. 7 is a diagram illustrating an example of a data table of a work information storage unit.
FIG. 8 is a diagram illustrating an example of a data table of an equipment information storage unit.
FIG. 9 is a diagram illustrating an example of a data table of an identical equipment constraint storage unit.
FIG. 10 is a diagram illustrating an example of a data table of a production line configuration information storage unit.
FIG. 11 is an example of a flowchart of a production line configuration change process according to Example 1.
FIG. 12 is a diagram illustrating an example of production line configuration information immediately after an error occurs.
FIG. 13 is an explanatory diagram of an estimated recovery time and an operation time.
FIG. 14 is a diagram illustrating an example in which a line configuration before a change and a result of the production line configuration after the change of the largest production quantity MP are displayed.
FIG. 15 is an example of a system configuration diagram of a production line configuration change system according to Example 2.
FIG. 16 is a diagram illustrating an example of a data table of a worker information storage unit according to Example 2.
FIG. 17 is a diagram illustrating an example of a data table of a work information storage unit according to Example 2.
FIG. 18 is an example of a flowchart of a production line configuration change process according to Example 2.
FIG. 19 is an example of a Gantt chart by item.
FIG. 20 is an example of the Gantt chart by item in which an insertion interval is shifted.
FIG. 21 is an example of a system screen according to Example 2.

DESCRIPTION OF EMBODIMENTS

Hereinafter, examples will be described with reference to drawings.

Example 1

FIG. 1 illustrates an example of an embodiment of a production line configuration change system 11 of the present example. The production line configuration change system 11 of the present example is a system which, in a case where a trouble or an error occurs in a certain manufacturing equipment constituting a production line, changes an operation program of a work assigned to manufacturing equipment which normally operates other than the certain manufacturing equipment or a tool to be mounted and continuously products a maximum throughput by using the current equipment included in the production line while the manufacturing equipment which stops due to the occurrence of the trouble or the error is recovered.

The production line configuration change system 11 receives error information 21 of manufacturing equipment in a factory or error information 22 from a terminal by a worker. In the production line configuration change system 11, a change plan of a production line configuration is calculated, a production line configuration change plan 23 is proposed to a person in charge of the production line configuration change, and a change in a work assignment or operation program 24 is downloaded to the manufacturing equipment.

FIG. 2 is an example of a system configuration diagram of the production line configuration change system of the present example.

The production line configuration change system is configured to include an error information management module 12, a work instruction module 13, a production line configuration calculation module 14, and a display terminal module 15. The error information management module 12 includes an error information management unit 31 and an error information storage unit 41. The work instruction module 13 includes an operation program information management unit 32, a work operation program information storage unit 42, and an equipment operation program information storage unit 43. The production line configuration calculation module 14 includes a work information management unit 33, an equipment information management unit 34, an identical equipment constraint management unit 35, a production line configuration calculation unit 36, a work information storage unit 44, an equipment information storage unit 45, an identical equipment constraint storage unit 46, and a production line configuration information storage unit 47. The display terminal module 15 includes a production line configuration output unit 37.

Each of the configuration modules 12 to 15 is connected to a network 71 and each of information terminals can mutually transmit and receive various data and the like via the network 71.

As illustrated in FIG. 3, each of the configuration modules 12 to 15 is configured by a general-purpose computer and includes an input device 61 such as a keyboard and a mouse, an output device 62 such as a display, an auxiliary storage device 63, and an arithmetic device 60 for executing various programs such as a failure diagnosis program. The arithmetic device 60 includes a central processing unit (hereinafter, CPU) 64, a main storage device 65, and an interface 66. The arithmetic device 60 is connected to the input device 61, the output device 62, and the auxiliary storage device 63 via the interface 66. In the present embodiment, an execution result of various programs such as a production line configuration change program is stored in a storage area secured in the main storage device 65. The various programs are stored in advance in the auxiliary storage device 63, thereafter, when the system operates, the various programs are read to the main memory 65 and executed by the CPU 64. By various programs being executed by the CPU 64, various functional units described below are realized.

In the present embodiment, as an example, a case where each of the information terminals constituting the production line configuration change system is realized by a general information processing device and software is described, but, for example, the production line configuration change system may be realized by hardware including hard-wired logic, such hardware, or a dedicated information processing device programmed in advance.

Next, a functional configuration of the production line configuration change system and data included in the production line configuration change system will be described.

As illustrated in FIG. 2, each of the configuration modules 12 to 15 of the production line configuration change system according to the present embodiment includes the functional units 31 to 37 realized by executing various programs in each of arithmetic devices, and the storage units 41 to 47 in which various data are stored.

The functional unit includes the error information management unit 31 which detects and manages trouble or error information inside the factory, the operation program information management unit 32 which manages operation program information for operating the equipment, the work information management unit 33 which manages work information such as each of work contents or tact times required for manufacturing the product, the equipment information management unit 34 which manages constraints such as the number of tools mounted on the equipment, the identical equipment constraint management unit 35 which manages a constraint of a plurality of works to be assigned to the identical equipment, the production line configuration calculation unit 36 which calculates the production line configuration in which the production quantity increases while satisfying each of equipment constraints until a recovery time, and the production line configuration output unit 37 which outputs a calculation result on a display terminal. Details of an operation of each of these functional units will be described step by step in the description of a processing flow.

The storage unit includes the error information storage unit 41 which stores an equipment ID in which an error occurs or an estimated time to a recovery, the work operation program information storage unit 42 which stores the operation program of each of the works, the equipment operation program information storage unit 43 which stores the operation program assigned to each piece of the equipment, the work information storage unit 44 which stores each of the work contents of the product or a work time per single equipment, the equipment information storage unit 45 which stores the equipment constraint such as the number of tools able to be mounted on the equipment, the identical equipment constraint storage unit 46 which stores the constraint of the plurality of works to be assigned to the identical equipment, and the production line configuration information storage unit 47 which stores the work content or the equipment, the process tact time, and the like of each of processes.

As illustrated in FIG. 4, the error information storage unit 41 stores an equipment ID field 341a in which an error occurs, an equipment name field 341b, an error occurrence time 341c for storing a time when the error occurs, an estimated recovery time 341d for storing an estimated time at which the error is recovered, and a recovery completion time 341e for storing a time in a case where the recovery is completed.

As illustrated in FIG. 5, the work operation program information storage unit 42 includes a work ID field 342a, a work name field 342b, and an operation program field 342c for storing an operation program name of the equipment required for performing the work.

As illustrated in FIG. 6, the equipment operation program information storage unit 43 includes an equipment ID field 343a, a work ID field 343b, a work name field 343c, an operation program field 343d in which the operation program name assigned to each piece of the equipment is stored, an instrument tool field 343e for storing an instrument tool mounted on the equipment, and a tool classification field 343f for storing a classification name of the mounted tool.

As illustrated in FIG. 7, the work information storage unit 44 includes a work number field 344a for storing a work number representing a work order for one product manufactured on the production line, a work ID field 344b, a work name field 344c, a work classification field 344d for storing the classification name of the work, a necessary tool field 344e for storing a tool name required for the work, and a work time field 344f for storing a work time per single equipment required for the work.

As illustrated in FIG. 8, the equipment information storage unit 45 includes an equipment ID field 345a, a mountable tool field 345*b* (in the present example, there are two examples of tools which can be mounted on the equipment, but depending on the equipment, including a case where a plurality of tools equal to or more than two can be mounted) for storing the tool name which can be mounted on the equipment, and a mountable number field 345*c* for storing the number of constraints for each of tool types which can be mounted on the equipment.

As illustrated in FIG. 9, the identical equipment constraint storage unit 46 includes a constraint No field 346*a* representing a constraint of a combination of the plurality of work numbers to be assigned to the identical equipment (identical process), a work number_1 field 346*b* for storing a first work number, and a work number_2 field 346*c* for storing a second work number. For example, FIG. 9 illustrates a constraint of assigning work numbers 001 and 002 to the identical equipment and a constraint of assigning the work numbers 006, 007, and 008 to the identical equipment.

As illustrated in FIG. 10, the production line configuration information storage unit 47 includes a process number field 347*a* for storing a process number representing a set of the works assigned to the identical equipment, a work number field 347*b*, a work name field 347*c*, a work classification field 347*d*, an equipment ID field 347*e* for storing the equipment ID to which each of the work is assigned, a tool name field 347*f* for storing the tool name of the tool mounted on each piece of the equipment, and a process tact time field 347*g* for storing the process tact time for each of the processes. For example, in FIG. 10, in the process number 1, equipment R001 and R002 respectively equips the tools (driver A and hand B) and executes the works of the work numbers 001 and 002 in parallel, and the process tact time of each piece of the equipment is 16.

In the present embodiment, the system for integrally processing the production line configuration change system is described, but the present example is not limited thereto. It is conceivable that the production line configuration change system of the present example is incorporated in another information processing system so as to function as a part of the production line configuration change system. In addition, a part of each of the information terminal functions may be recombined, subdivided, or summarized.

FIG. 11 illustrates a flowchart of a production line configuration change process of Example 1. In step S1, data stored in the error information storage unit 41 as the error information 21 of the manufacturing equipment in the factory is read by the error information management unit 31. When receiving a report of the error information 21 of the manufacturing equipment in the factory, the error information management unit 31 searches history information of a time required for recovering the equipment after the identical error occurs in the past from sensor information of the equipment, calculates the estimated recovery time 341*d* according to a statistical process, and stores the calculation with the error information 21 in the error information storage unit 41. Alternately, in a case where there is no history information that the identical error occurs in the past, the worker inputs the estimated recovery time 341*d* according to an error state of the equipment.

Next, in step S2, the work information management unit reads the work information of the product under the manufacturing on the production line from the work information storage unit 44 in which the work information is stored.

Next, in step S3, the equipment information management unit 34 reads all pieces of equipment information of the production line from the equipment information storage unit 45. The identical equipment constraint management unit 35 reads identical equipment constraint information from the identical equipment constraint storage unit 46.

Next, in step S4, the production line configuration information management unit 35 reads the production line configuration information from the production line configuration information storage unit 46.

FIG. 12 illustrates an example of the production line configuration information read until step S4 immediately after an error occurs. In the present example, the error occurs in the equipment R4. In order to increase the production quantity, it is necessary to calculate the production line configuration change plan from the read error information, the read work information, the read equipment information, the read identical equipment constraint information, and the read production line configuration information and to change the production line configuration.

In step S5, for the production line configuration information read in S4, the production line configuration calculation unit 36 prepares the change plan of assigning the work assigned to the equipment in which the error occurs to the equipment before or after the process or another equipment of the identical process and calculates a provisional production line configuration by assigning the work stored in the work information storage unit 44 to each piece of the equipment according to the plan. At this time, for example, each of the followings is constrained.

Constraint 1

As illustrated in the equipment information storage unit 45, the tool which can be mounted on each piece of the equipment is determined. In each piece of the equipment, the tool required for the assigned work is constrained by the tool registered in the mountable tool stored in the equipment information storage unit.

Constraint 2

As illustrated in the equipment information storage unit 45, the number of work classifications of each piece of the equipment to which the work can be assigned is determined. For example, as illustrated in FIG. 8, only two driver types can be mounted on the equipment R001. In each piece of the equipment, a total number of the work classifications stored in the work information storage unit of the assigned work is constrained so that the total number of the work classifications is equal to or smaller than the number of the work classifications stored in the equipment information storage unit.

Constraint 3

The total number of tools for the entire production line of the change plan is constrained so that the total number of tools is equal to or smaller than the total number of tools immediately after the error occurs. This means that it is not possible that a new tool is mounted on the equipment by adopting the new tool from another place while the total number of tools exceeds the total number of tools stored in the production line immediately after the error occurs. (A solution that by using the tool included in the production line, the production line configuration is promptly changed when the error occurs and production is continued until error recovery, is searched.).

Constraint 4

There is the work to be assigned to the identical equipment. For example, it is conceivable that if screw tightening is not performed, component placement is not performed because the product is unstable but, in this case, the screw tightening and the component placement are constrained to be assigned to the identical equipment. Constraint information is defined in advance in the identical equipment constraint storage unit 46.

Constraint 5

The work has a precedence relationship constraint. The work of a work number j is constrained so that the work number (j−1) is assigned to the previous process number or the identical process number.

Constraint 6

When the work number j is assigned to a certain equipment, it is necessary for the equipment to satisfy either (1) whether the work number (j−1) is assigned or (2) whether all of the work numbers (1 to j−1) are not assigned. This becomes a constraint which prevents the works of a plurality of inconsecutive numbers from being assigned so that work numbers 1 and 3 are assigned to the certain equipment.

Constraint 7

In the production line configuration immediately after the error occurs, it is necessary for the work number j to be assigned to an equipment group of the identical process. In some cases, different processes are far apart from one another. In the production line configuration immediately after the error occurs, the production line configuration is constrained so that the identical work cannot be assigned to the pieces of the equipment which span the different process numbers.

Each of the above constraints is satisfied, all of the works are assigned to any equipment or a plurality of pieces of equipment, and the provisional production line configuration is calculated.

In step S6, in a production line evaluation process of the production line configuration calculation unit 36, the provisional production line configuration calculated in S5 is evaluated. Basically, it is preferable to increase the number of the production quantity until the estimated recovery time.

A variable $x_{ij}$ indicating whether or not to assign a work j to equipment i is set. Here, in a case where the work j is assigned to the equipment i, $x_{ij}=1$ is set and in a case where the work j is not assigned to the equipment i, $x_{ij}=0$ is set. When a work time per single equipment of the work number j stored in the work information storage unit 44 is set to $t_j$, a work tact time $Tact_j$ which is a value obtained by dividing the work time $t_j$ of the work j by the number of pieces of equipment is calculated by Equation 1.

$$tact_j = \frac{t_j}{\sum_i x_{ij}} \quad \text{(Equation 1)}$$

Here, the process tact time $Tact_i$ of the equipment i is calculated by Equation 2.

$$tact_i = \Sigma_j x_{ij} \cdot tact_j \quad \text{(Equation 2)}$$

A tact time MTact of the entire production line is calculated by a maximum value of a process tact time $tact_i$ of each piece of the equipment as illustrated in Equation 3. Here, I is aggregation of all of the pieces of the equipment $$Mtact = \max(tact_i | i \in I) \quad \text{(Equation 3)}$$

Here, for the production quantity before the estimated recovery time stored in the error information storage unit 41, it is necessary to consider a replacement time of an instrument in each piece of the equipment.

As illustrated in FIG. 13, Tp is a front setup-time necessary for instrument replacement. Ta is a rear setup-time for returning to the usual production line configuration after the error recovery. Tr is the estimated recovery time which is a difference from a current time to the estimated recovery time. Then, since the operation time after the production line configuration is changed is Tr−Tp−Ta, the production quantity MP until the estimated recovery time is calculated by Equation 4.

$$MP = \frac{T_r - T_p - T_a}{Mtact} \quad \text{(Equation 4)}$$

For example, the setup-times Tp and Ta in the above example can be obtained by setting the replacement time of one instrument, by calculating the number of times the instrument is changed for each of instrument types based on comparison of the current line with the provisional production line, and by multiplying the number of times the instrument is changed by the set instrument replacement time.

If a provisional production line configuration calculating process (step S5) and the production line evaluation process (step S6) are repeated until the production quantity MP up to the estimated recovery time is guaranteed to be the maximum or until a calculation time or the like becomes an upper limit and the calculation is completed (step S7), as illustrated in FIG. 14, the production line configuration output unit 37 displays the line configuration before the change and a production line configuration result of the largest production quantity MP after the change (step S8). The person in charge of the production line configuration change checks a system screen and adjusts the production line configuration as necessary.

After then, in step S9, based on the determined provisional-production line configuration, a work ID, a work name, an operation program, an instrument tool, and tool classification are registered in the equipment operation program information storage unit 43 and a process number, an equipment ID, a tool name, and a process tact time are registered in the production line configuration information storage unit 47.

According to the process described above, it is possible to obtain the provisional production line configuration in which the production quantity up to the recovery time is increased while the constraint of each piece of the equipment is satisfied.

In the present embodiment, the system, in which when a trouble or an error occurs in the equipment on the production line under the manufacturing of a certain product, while the stopped equipment is recovered, the remaining equipment included in the production line is used, the production line configuration is changed, and the manufacture of the product is continued so as to maximize a throughput, is described. By applying the production line configuration change system described in the present example, for example, it is possible to apply the system to a need of manufacturing a second product having a slightly design change of a certain (first) product currently being manufactured by interrupt by using the equipment included in the current production line only for a certain period.

In this case, the work information of the second product is prepared separately, but it is assumed that a difference between the work information of the second product and the work information of the first product is slight. Based on the work having a difference in the work information, the provisional production line configuration, in which each of the works before and after the work is assigned to each piece of the equipment on the production line, is calculated up to an estimated manufacture completion time of the second product. It is possible to apply the provisional production line configuration determined by the evaluation process to the manufacture of the second product having the design change.

Example 2

In the present example, for a work in which a person and equipment cooperate with each other, an example in which the work is assigned not only to the equipment of Example 1, but also to the worker, will be described.

FIG. 15 is an example of a system configuration diagram of the production line configuration change system of the present example. In addition to Example 1, the system includes a worker information management unit 38 and a worker information storage unit 48.

As illustrated in FIG. 16, the worker information storage unit 48 includes a worker ID field 348a for storing a worker ID, a worker name 348b, a work number field 348c for storing the work number for which the worker works, a work ID field 348d for storing the work ID, a work name field 348e for storing the work name.

As illustrated in FIG. 17, the work information storage unit 44 according to Example 2 includes a worker cooperation field 344g for storing information indicating whether or not the target work requires cooperation of the worker in addition to the work information storage unit 44 of Example 1.

A description of the configuration given the same reference numeral as illustrated in FIG. 2 which is already described will be omitted.

Next, a processing method of the present example will be described.

FIG. 18 illustrates a flowchart of a production line configuration change method process of Example 2. After the provisional line configuration is calculated, evaluated, and determined in steps S5 to S7, the number of required workers is calculated in step S10.

A concept of the number of workers will be described by using a Gantt chart by items in FIGS. 19 and 20. In FIG. 19, an insertion interval of an item 1 and an item 2 is set as MTact. At this time, a time overlap 83 occurs in a component placement A 81 and a component placement C 82 which are human cooperation works. For this reason, two workers are required in total for one person in the component placement A and one person in the component placement C.

On the contrary, in FIG. 20, the insertion interval between the item 1 and the item 2 is set as MTact+α. At this time, the time overlap does not occur in the component placement A and the component placement C. Since a worker 84 only has to perform the component placement C after performing the component placement A, only one worker is required.

In step S10, in the calculation process of the number of required workers in the production line configuration calculation unit 36, firstly, the tact time calculated in the evaluation process of the provisional line configuration in step S6 is set as the insertion interval and the number of required workers is calculated based on the number of overlaps of the human cooperation work. In a case where the number of required workers exceeds the number of workable workers obtained by the worker information storage unit 48, the insertion interval is lengthened by an increase time (for example, increased by 1 minute) set in advance and the number of required workers is calculated again. When the number of required workers is decreased, the insertion interval is stored. By repeating this until the insertion interval reaches a total work time of 80, the insertion interval for each of the number of required workers is stored.

In step S11, in the production line configuration display process of the production line configuration output unit 37, as illustrated in FIG. 21, the production line configuration for each of the number of required workers is displayed. The person in charge of the production line configuration change checks the system screen. A support request, the insertion interval, and the like are considered according to the number of persons (workers 85 and 86 alternately perform cooperation work with the equipment R5 in the process 3, and worker 85 performs cooperation work with the equipment R6 and worker 86 performs cooperation work with the equipment R7 in the process 4) required for the production line configuration.

After then, in step S12, based on the determined provisional-production line configuration, the work ID, the work name, the operation program, the instrument tool, and the tool classification are registered in the equipment operation program information storage unit 43, the process number, the equipment ID, the tool name, and the process tact time are registered in the production line configuration information storage unit 47, and the work number, the work ID, and the work name assigned to the worker are registered in the worker information storage unit 48.

According to the process described above, it is possible to obtain the provisional production line configuration in which the production quantity up to the recovery time is increased while the constraint of each piece of the equipment or the worker is satisfied.

In the present embodiment, the system, in which when a trouble or an error occurs in the equipment on the production line under the manufacturing of a certain product, while the stopped equipment is recovered, the remaining equipment included in the production line is used, the production line configuration is changed, and the manufacture of the product is continued so as to preferably increase a throughput and to preferably decrease the number of required workers, is described. By applying the production line configuration change system described in the present example, for example, in the same manner as in Example 1, it is possible to apply the system to a need of manufacturing a second product having a slightly design change of a certain (first) product currently being manufactured by interrupt by using the equipment included in the current production line only for a certain period.

The present invention is not limited to the examples described above, but includes various modification examples. For example, the examples described above have been described in detail in order to explain the present invention in an easy-to-understand manner, and are not necessarily limited to those having all the configurations described. In addition, a part of the configuration of one example can be replaced with the configuration of another example, and the configuration of another example can be added to the configuration of one example. In addition, it is possible to add, delete, and replace other configurations with respect to the part of the configuration of each of the examples.

Further, each of the configurations, functions, processing units, processing means, and the like described above may be realized by hardware by designing with integrated circuits, for example. In addition, each of the configurations and the functions described above may be realized by software by interpreting and executing a program which realizes the respective functions by a processor. Information such as a program, a table, a file, or the like which realizes each of the function can be stored in a recording device such as a memory, a hard disk, a solid state drive (SSD), or the like or a recording medium such as an IC card, an SD card, a DVD, or the like.

REFERENCE SIGNS LIST 11 production line configuration change system
12 error information management module
13 work instruction module
14 production line configuration calculation module
15 display terminal module
21 error information of manufacturing equipment in factory
22 error information from terminal by worker
23 production line configuration change plan
24 work assignment or operation program downloaded to factory
31 error information management unit
32 operation program information management unit
33 work information management unit
34 equipment information management unit
35 identical equipment constraint management unit
36 production line configuration calculation unit
37 production line configuration output unit
38 worker information management unit
41 error information storage unit
42 work operation program information storage unit
43 equipment operation program information storage unit
44 work information storage unit
45 equipment information storage unit
46 identical equipment constraint storage unit
47 production line configuration information storage unit
48 worker information storage unit
60 arithmetic device
61 input device
62 output device
63 auxiliary storage device
64 central processing unit (CPU)
65 main storage device
66 interface
71 network
80 total work time
81 component placement A
82 component placement C
83 time overlap
84 to 86 workers

The invention claimed is:

1. A production line configuration change system comprising:
an error information storage unit that stores information of an error which occurs in equipment on a production line;
a work information storage unit that stores work contents required for manufacturing a product;
an equipment information storage unit that stores constraint information of a tool mountable on the equipment;
a production line configuration information storage unit that, in order of manufacturing processes of the product, stores a work content, work assignment equipment, a tool mounted on the equipment, and a process tact time in each of the manufacturing processes; and
a processor configured to:
prepare a change plan of assigning a work assigned to the equipment in which the error occurs to the equipment of a process before or after a process in which the error occurs or another equipment of the identical process, for production line configuration information stored in the production line configuration information storage unit, by using the equipment and the tool included in the production line, and calculates a provisional production line configuration; and
adopt, among the provisional production line configurations calculated by a plurality of change plans, the provisional production line configuration of anticipating the largest production quantity during an operation time obtained by subtracting a set-up time required for instrument replacement from an estimated recovery time until an estimated recovery timing of the equipment in which the error occurs.

2. The production line configuration change system according to claim 1, further comprising:
an identical equipment constraint storage unit that stores constraints of a plurality of pieces of work information to be assigned to the identical equipment,
wherein the processor is further configured to calculate the provisional production line configuration so as to satisfy constraint information stored in the equipment information storage unit and constraint information stored in the identical equipment constraint storage unit.

3. The production line configuration change system according to claim 1,
wherein the processor is further configured to receive a request of manufacture of another product having a design change, prepare a change plan of assigning a work specific to the another product to the equipment of the production line, for the production line configuration information stored in the production line configuration information storage unit, by using the equipment and the tool included in the production line, and calculates the provisional production line configuration.

4. The production line configuration change system according to claim 1, further comprising:
a worker information storage unit that stores work contents which a worker works,
wherein the processor is further configured to calculate, even if an insertion interval of the product is slightly increased, the provisional production line configuration capable of reducing the number of workers who perform a cooperation work with the equipment.

5. The production line configuration change system according to claim 1, further comprising:
a work operation program information storage unit that stores an operation program of each of the works; and
an equipment operation program information storage unit that stores the operation program assigned to each piece of the equipment,
wherein the processor is further configured to change the operation program of the work of the equipment on the production line according to a calculation result of the provisional production line configuration.

6. The production line configuration change system according to claim 1, wherein the processor is further configured to calculate the number of times the instrument tool is replaced from a difference between the production line configuration before the change and the provisional production line configuration after the change and calculates the set-up time from the number of times the instrument tool is replaced.

7. A production line configuration change system comprising:
   an error information storage unit that stores information of an error which occurs in equipment on a production line;
   a work information storage unit that stores work contents required for manufacturing a product;
   an equipment information storage unit that stores constraint information of a tool mountable on the equipment;
   a production line configuration information storage unit that, in order of manufacturing processes of the product, stores a work content, work assignment equipment, a tool mounted on the equipment, and a process tact time in each of the manufacturing processes;
   an identical equipment constraint storage unit that stores constraints of a plurality of pieces of work information to be assigned to the identical equipment; and
   a processor configured to:
   prepare a change plan of assigning a work assigned to the equipment in which the error occurs to the equipment of a process before or after a process in which the error occurs or another equipment of the identical process, for production line configuration information stored in the production line configuration information storage unit, by using the equipment and the tool included in the production line, and calculates a provisional production line configuration; and
   calculate the provisional production line configuration so as to satisfy constraint information stored in the equipment information storage unit and constraint information stored in the identical equipment constraint storage unit,
   wherein the constraint information stored in the equipment information storage unit and the constraint information stored in the identical equipment constraint storage unit include the maximum number per classification of the tool mountable on the equipment, a work group which needs to be assigned to the identical equipment, and a constraint that a total number of tools of the production line configuration after the change is to be equal to or smaller than a total number of tools included in the production line immediately after the error occurs.

8. A production line configuration change method of changing a production line configuration by a calculator, the method comprising:
   in a case where an error occurs in equipment constituting a production line and the equipment stops, preparing a change plan of assigning a work assigned to the equipment in which the error occurs to the equipment before or after a process or another equipment of the identical process, for production line configuration information before the error occurs, by using the equipment and a tool included in the production line and calculating a provisional production line configuration;
   when calculating the provisional production line configuration, calculating only the provisional production line configuration satisfying the maximum number per classification of the tool mountable on the equipment, a work group which needs to be assigned to the identical equipment, and a constraint that a total number of tools of the production line configuration after the change is equal to or smaller than the total number of tools included in the production line immediately after the error occurs;
   among the provisional production line configurations calculated by a plurality of change plans, performing determination of adopting the provisional production line configuration of anticipating the largest production quantity during an operation time obtained by subtracting a set-up time required for instrument replacement from an estimated recovery time until an estimated recovery timing of the equipment in which the error occurs; and
   changing an operation program of the work of the equipment on the production line according to the determined provisional production line configuration.

* * * * *